United States Patent [19]
Johnson

[11] 3,841,036
[45] Oct. 15, 1974

[54] TRAILER DECK
[76] Inventor: Jesse Ronald Johnson, 277 E. Kiowa, Mountainaire, Ariz. 86001
[22] Filed: Mar. 26, 1973
[21] Appl. No.: 344,827

[52] U.S. Cl........................... 52/28, 52/143, 52/185, 52/236
[51] Int. Cl........................... E04b 1/12, E04f 11/04
[58] Field of Search............ 52/143, 169, 236, 278, 52/184, 185, 173, 28

[56] References Cited
UNITED STATES PATENTS

| | | | |
|---|---|---|---|
| 2,561,168 | 7/1951 | Beckley | 52/143 X |
| 2,924,829 | 2/1960 | Mosier | 52/143 X |
| 3,153,912 | 10/1964 | Retz | 52/169 X |
| 3,452,493 | 7/1969 | Mims | 52/184 X |
| 3,508,366 | 4/1970 | Youngkin | 52/143 X |
| 3,546,827 | 12/1970 | Demarais | 52/169 X |
| 3,593,471 | 7/1971 | Fields | 52/236 X |
| 3,750,351 | 8/1973 | Greenburg | 52/143 X |
| 3,750,354 | 8/1973 | Boros | 52/236 |
| 3,755,974 | 9/1973 | Berman | 52/185 X |

*Primary Examiner*—Price C. Faw, Jr.

[57] ABSTRACT

A trailer manufactured with a roof adapted to outdoor living features a fenced in roof area and access thereto by indoor/outdoor stairs. The area thus enclosed has a surface or surfaces treated for outdoor living, has lighting in receptacles.

5 Claims, 2 Drawing Figures

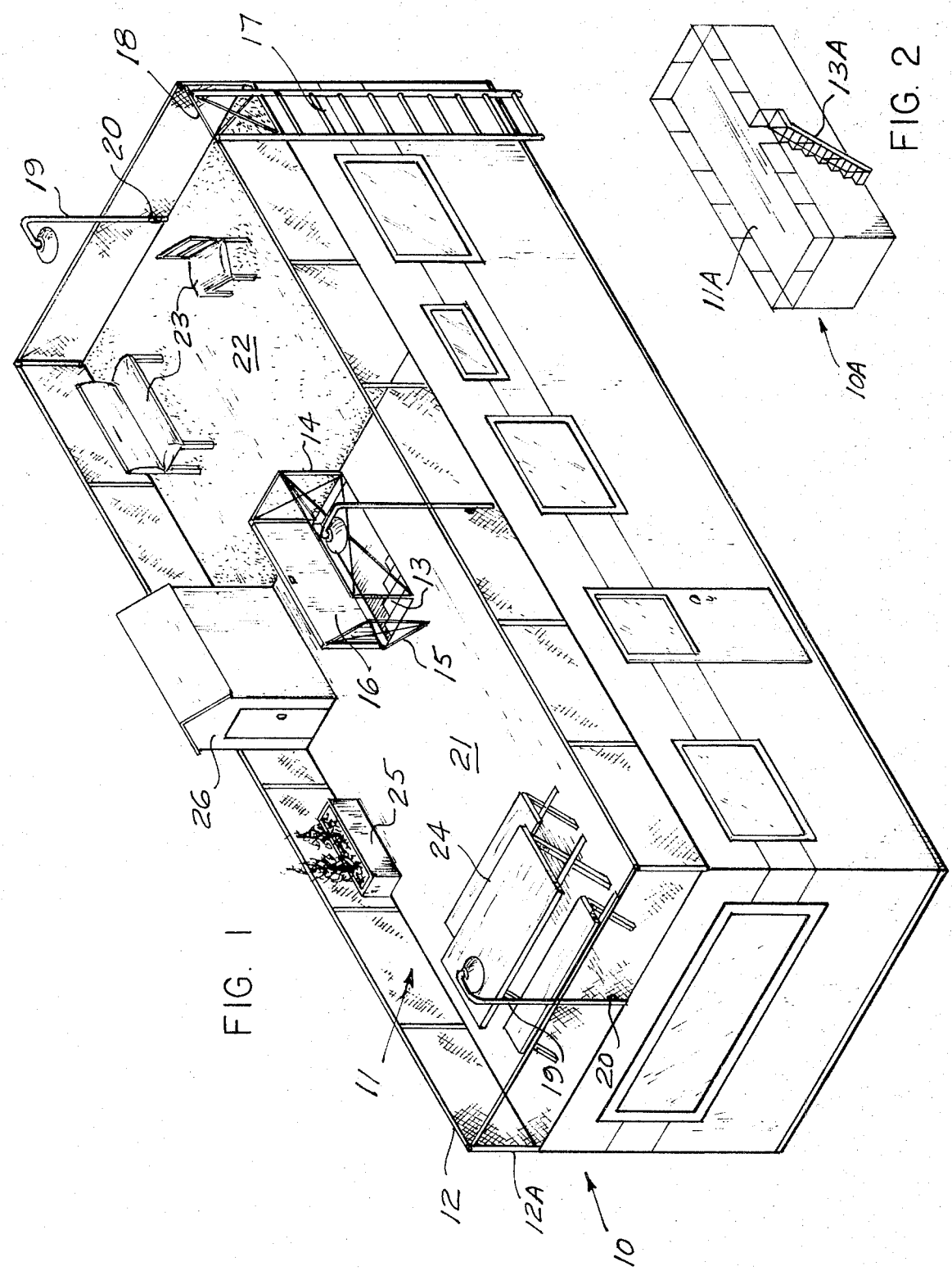

TRAILER DECK

This invention applies to trailers, more specifically to trailer structures.

A principal object of this invention is to provide a trailer having an essentially flat roof, a fence surrounding the roof, the roof surface treated for outdoor living and accessibility to the roof by stairs.

Another object of the present invention is to provide a trailer of the type described in which the roof is provided with lighting fixtures and power outlets.

Still another object is to make the roof more suited to outdoor living by having the addition of storage space for articles primarily intended for use on the roof.

These and other objects will become evident upon a study of the following specification together with the accompanying drawing wherein:

FIG. 1 is a view of a trailer roof, according to the invention;

FIG. 2 is a schamatic perspective view of a modified form of roof.

The present invention seeks to promote interest in and purchase of mobile homes by adding leisure space available on the roof of the trailer. A roof deck has the advantage of privacy and adds to the enjoyment of a home on wheels without having to travel to recreation areas. Many trailer parks have very limited or no yard area. With the present arrangement the floor space is more than doubled at a low additional cost. Such a roof area is particularly recommended for no or low snawfall areas. Attractively made and furnished such an area becomes invaluable for those living in confining trailer courts.

Referring to FIG. 1, the trailer 10 is constructed to have a roof living area 11. The area is identified by an enclosing fence 12 of a durable light-weight mesh material as shown or the like, or windshielding clear plastic panels. The fence is supported by an appropriate number of fence posts 12a. A staircase 13 leads up to the roof from the interior of the trailer. Although the staircase can be rigid, it preferably should be of the drop tyoe in order to conserve the space inside the trailer. A guard rail 14 terminating in an entrance gate 15 surrounds the stairwell. A hinged door 16 closes off the stairwell against weather, temperature, privacy and security.

Although a stairway serves the purpose for communication between both levels, it is generally advisable and may be Code-necessary to have a ladder 17 at a point remote from the stairwell. Such a ladder attached permanently to the wall of the trailer leads up to a gate 18. Alternately, ladder 17 may be detachable or hinged at the deck level if necessary in transit or to extend security when the trailer is not occupied.

For enjoyment of the deck in the evening, two or more light standards 19 are added. Wired near the base of the light, receptacles 20 are available for plugging in appliances.

The roof area is shown divided into two parts, one part 21 may be treated by covering it with material resembling brick, terrazo or the like. The other part 22 is shown as having an outdoor weather type carpeting or immitation lawn on which outdoor furniture pieces 23 may be arranged. Other furnishings may be a picnic table and bench set 24 and decor such as a flowerbox 25.

Articles primarily intended for use afterwards such as cook-out equipment, lounging coushions, folding furniture, patio umbrella and the like may be stored in a decorative enclosure 26.

As a variation in construction, where space or accessbility in the interior of the trailer precludes the inclusion of an internal stairway 13, an external stairway may be used.

Referring to FIG. 2, a trailer 10a constructed in this manner has a roof area 11a that opens out to an external stairway 13a. Where such a stairway would interfere with transit, manufacturing methods known in the art can be used to install a folding stairway so that there is no appreciable increase in the width of the trailer.

What I now claim is:

1. An open air deck for increasing the habitable area of a flat roofed trailer and being mounted upon the roof of the trailer, said deck comprising:
   a. access means disposed within the roof of the trailer for providing communication between the interior of the trailer and said deck;
   b. guard means disposed about said access means for restricting passage through said access means;
   c. peripheral fence means extending about the edge of the roof for defining the perimeter of said deck, said fence means also preventing trespass from said deck;
   d. decorative means attached to said deck for enhancing the aesthetic value of said deck;
   e. a source of electrical power disposed within said deck; and
   f. electrical light means connectable to said source for illuminating said deck; whereby, the living area for the occupants of the trailer is increased by said deck.

2. The deck as set forth in claim 1 including further access means mounted adjacent the external wall of the trailer for providing an alternate passageway to said deck.

3. The deck as set forth in claim 1 wherein said access means comprises:
   a. a hinged trap door, said trap door being adapted for upward pivotal movement; and
   b. a drop stairway extending downwardly from said deck into the interior of the trailer; whereby, said access means impedes neither the living area of said deck nor the living area within the trailer.

4. The deck as set forth in claim 3 wherein said guard means includes a gate for selectively controlling movement to and from said trap door.

5. The deck as set forth in claim 4 wherein said guard means and said fence means comprises lightweight mesh material.

* * * * *